(12) United States Patent
Kuehne et al.

(10) Patent No.: US 10,579,139 B2
(45) Date of Patent: Mar. 3, 2020

(54) METHOD FOR OPERATING VIRTUAL REALITY SPECTACLES, AND SYSTEM HAVING VIRTUAL REALITY SPECTACLES

(71) Applicant: AUDI AG, Ingolstadt (DE)

(72) Inventors: Marcus Kuehne, Beilngries (DE); Thomas Zuchtriegel, Munich (DE)

(73) Assignee: AUDI AG, Ingolstadt (DE)

( * ) Notice: Subject to any disclaimer, the term of this patent is extended or adjusted under 35 U.S.C. 154(b) by 206 days.

(21) Appl. No.: 14/743,226

(22) Filed: Jun. 18, 2015

(65) Prior Publication Data
US 2015/0378154 A1 Dec. 31, 2015

(30) Foreign Application Priority Data
Jun. 26, 2014 (DE) .......... 10 2014 009 302

(51) Int. Cl.
*G02B 27/01* (2006.01)
*G06F 3/01* (2006.01)
*G02B 27/00* (2006.01)

(52) U.S. Cl.
CPC .......... *G06F 3/013* (2013.01); *G02B 27/0093* (2013.01); *G02B 27/017* (2013.01); *G06F 3/011* (2013.01); *G06F 3/012* (2013.01); *G02B 2027/014* (2013.01); *G02B 2027/0187* (2013.01)

(58) Field of Classification Search
CPC .......... G06F 3/011; G06F 3/012; G06F 3/013; G06F 3/04815; G06F 3/0346; G02B 2027/0178; G02B 27/017; G02B 2027/0138; G02B 2027/0132; G02B 2027/014; G02B 2027/0141; G02B 27/01; G06T 19/006
See application file for complete search history.

(56) References Cited

U.S. PATENT DOCUMENTS 6,307,564 B1 * 10/2001 Kawakami .............. G06F 3/011
  345/474
7,928,926 B2   4/2011 Yamamoto et al.
(Continued)

FOREIGN PATENT DOCUMENTS

DE   10 2014 009 302.6     6/2014

OTHER PUBLICATIONS

Paul Grimm et al., "Virtual and Augmented Reality (VR/AR)," Berlin Heidelberg: Springer, 2013, pp. 122-123 and 151-153.
(Continued)

*Primary Examiner* — Patrick N Edouard
*Assistant Examiner* — Peijie Shen
(74) *Attorney, Agent, or Firm* — Staas & Halsey LLP (57) ABSTRACT

A method operates virtual reality spectacles involves displaying a virtual object, arranged in virtual surroundings, by the virtual reality spectacles from a first observation position that is prescribed within the virtual surroundings. A position symbol is displayed at a position within the virtual surroundings that corresponds to a second observation position prescribed within the virtual surroundings. The displayed position symbol is selected as soon as a predetermined selection action has been sensed. The virtual object is displayed from the second observation position as soon as a predetermined confirmation action for the selected position symbol has been sensed.

19 Claims, 4 Drawing Sheets

(56) References Cited

U.S. PATENT DOCUMENTS

| | | | |
|---|---|---|---|
| 2001/0015718 A1* | 8/2001 | Hinckley | A63F 13/06 345/156 |
| 2007/0146390 A1 | 6/2007 | Noro et al. | |
| 2007/0296646 A1* | 12/2007 | Yamamoto | G02B 27/017 345/8 |
| 2011/0175932 A1 | 7/2011 | Yu et al. | |
| 2011/0282537 A1* | 11/2011 | Yamasaki | G06F 3/017 701/31.4 |
| 2013/0300740 A1* | 11/2013 | Snyder | G06F 3/016 345/420 |
| 2013/0321461 A1* | 12/2013 | Filip | G06F 3/011 345/632 |
| 2014/0208272 A1* | 7/2014 | Vats | G06F 3/011 715/852 |
| 2014/0300636 A1* | 10/2014 | Miyazaya | H04R 5/033 345/633 |
| 2015/0007114 A1* | 1/2015 | Poulos | G06F 3/012 715/852 |

OTHER PUBLICATIONS

German Office Action for German Priority Patent Application No. 10 2014 009 302.6, dated Mar. 9, 2015, 9 pages.

* cited by examiner

METHOD FOR OPERATING VIRTUAL REALITY SPECTACLES, AND SYSTEM HAVING VIRTUAL REALITY SPECTACLES

CROSS REFERENCE TO RELATED APPLICATIONS

This application is based on and hereby claims priority to German Application No. 10 2014 009 302.6 filed on Jun. 26, 2014, the contents of which are hereby incorporated by reference.

BACKGROUND

The invention relates to a method for operating virtual reality spectacles and to a system having virtual reality spectacles.

Virtual reality spectacles are a particular form of what is known as a head mounted display, which is a visual output appliance worn on the head. Said output appliance presents images on a screen close to the eyes or projects them directly onto the retina. In this case, virtual reality spectacles additionally have sensors for sensing the movement of the head. This allows the display of the computed graphics to be matched to the movements of the wearer of the spectacles. The physical proximity means that the displayed image areas from head mounted displays have the effect of being substantially larger than the freestanding screens and, in extreme cases, even cover the entire field of view of the user. Since the display follows all head movements by the wearer as a result of the posture of the head, the user is provided with the feeling of moving directly in an image landscape generated by a computer.

Virtual reality spectacles of this kind can thus be used to present a virtual reality, virtual reality usually denoting the presentation and simultaneous perception of reality in its physical properties in interactive virtual surroundings that are computer-generated in real time.

In virtual reality surroundings, a particular challenge is to provide a suitable opportunity for interaction in order to determine or to alter the virtual position of the wearer of such spectacles in relation to an object presented by the virtual reality spectacles. Free movements within the presented virtual reality, in particular, for example brought about by a controller or joystick, can quickly lead to nausea in the wearer of virtual reality spectacles, since during the virtual movement an inconsistency arises between the visual impressions and the lack of movement feedback from the vestibular system in the inner ear.

SUMMARY

It is therefore one possible object to provide a method for operating virtual reality spectacles and a system having virtual reality spectacles that allow improved alteration of the virtual position of a wearer of the spectacles within virtual surroundings displayed by the virtual reality spectacles.

The inventors propose a method for operating virtual reality spectacles, in which at least one virtual object arranged in virtual surroundings is displayed by the virtual reality spectacles from a first observation position prescribed within the virtual surroundings. Furthermore, at least one position symbol is displayed at a position within the virtual surroundings that corresponds to a second observation position prescribed within the virtual surroundings. The displayed position symbol is selected as soon as a predetermined selection action has been sensed. The virtual object is displayed from the second observation position as soon as a predetermined confirmation action for the selected position symbol has been sensed.

In other words, the proposal thus provides for a wearer of virtual reality spectacles to be able to move, particularly to be able to skip, from a prescribed observation position to another observation position within the virtual surroundings by selecting an appropriately displayed position symbol and confirming the selection thereof. In this case, one or more possible skip positions can be displayed to him in the form of the displayed position symbol or further position symbols in their physically correct position within the virtual surroundings. In other words, the prescribed observation positions are thus virtual viewpoints at which the wearer of the virtual reality spectacles is situated virtually within the displayed virtual surroundings, the virtual reality spectacles or the display device thereof being actuated such that the wearer of the virtual reality spectacles is provided with the impression that he is currently looking at the virtual object from the correspondingly prescribed observation position.

The problem mentioned at the outset that can arise with free movements within a virtual reality is remedied by the solution since the wearer of the virtual reality spectacles no longer moves freely within the displayed virtual surroundings according to his visual perception. Instead, the wearer of the virtual reality spectacles can use the method to skip from one virtual observation position to the next and hence alter his virtual viewpoint within the displayed virtual surroundings in fits and starts and hence to alter the perspective on the currently displayed virtual object likewise by leaps and bounds. This prevents any inconsistency from arising between the visual impressions and the actually provided movement feedback from the vestibular system of the wearer of the virtual reality spectacles, which means that it is possible to prevent the occurrence of nausea in a wearer of the virtual reality spectacles.

In one advantageous refinement, the displayed position symbol is selected as soon as the predetermined selection action that has been sensed is that a selection symbol displayed within the virtual surroundings has been made to at least partially overlap the displayed position symbol. The movement of the selection symbol can be controlled by the wearer of the virtual reality spectacles as appropriate, which allows him to prompt selection of the displayed position symbol in a particularly simple and convenient manner. By way of example, the displayed selection symbol, which is also intended to be understood as a selective symbol, may be a crosshair, a mouse pointer or the like.

In a further advantageous refinement, the selection symbol is moved on the basis of a sensed head movement by a wearer of the virtual reality spectacles within the virtual surroundings. By way of example, the virtual reality spectacles may have a combination of a three-axis gyrometer and acceleration sensors that can be used to reliably sense the head movement of the wearer of the virtual reality spectacles. Since the selection symbol is moved on the basis of the sensed head movement of the wearer within the virtual surroundings, the selection symbol can be moved in a particularly simple and convenient manner by the wearer of the virtual reality spectacles within the virtual surroundings.

According to a further advantageous embodiment, the selection symbol is moved on the basis of a sensed eye movement by the wearer of the virtual reality spectacles within the virtual surroundings. For this, the virtual reality spectacles can have a sensing device, for example, that is designed to sense eye movements, particularly the line of vision of the wearer of the virtual reality spectacles. Eye-movement-controlled movement of the selection symbol within the virtual surroundings gives rise to the particular advantage that the selection symbol can be moved particularly quickly and easily. In this case, the selection symbol can also be moved either on the basis of the sensed head movement or on the basis of the sensed eye movement of the wearer of the virtual reality spectacles. This results in a particularly convenient and intuitive control option for the selection symbol for the wearer of the virtual reality spectacles. This is because the wearer of the virtual reality spectacles simply needs to just look at the position symbol in question that is displayed in the virtual surroundings in order to select the position symbol.

According to a further advantageous embodiment, the position symbol, preferably also the selection symbol, is displayed within the virtual surroundings only when an operating element, particularly a key arranged on a remote control coupled to the virtual reality spectacles, is touched. In other words, a type of movement mode is activated only when the operating element is touched, said movement mode being characterized in that the position symbol, particularly also the selection symbol, is displayed only when a touch is sensed on the operating element. This makes it easy for a wearer of the virtual reality spectacles to see whether or not he is currently able to perform a virtual alteration of position within the displayed virtual surroundings.

In a further advantageous embodiment, the position symbol is hidden from the virtual surroundings as soon as the touch on the operating element is lifted. Preferably, the selection symbol is likewise hidden from the virtual surroundings as soon as the touch on the operating element is lifted. The wearer of the virtual reality spectacles therefore needs to keep a finger continuously touching said operating element, for example, in order to keep the movement mode activated. This prompts particularly conscious activation and deactivation of the movement mode. Thus, as soon as the wearer of the virtual reality spectacles should have no desire at all to alter his virtual position within the virtual surroundings and hence also his angle of vision with respect to the displayed virtual object, he can simply take his finger from the previously touched operating element, for example. The position symbol and preferably also the selection symbol are then hidden and the wearer of the virtual reality spectacles can look at the displayed virtual object without any interfering influences.

In a further advantageous refinement, the virtual object is displayed from the second observation position only when the predetermined confirmation action that has been sensed is that an operating element, particularly a key arranged on a remote control coupled to the virtual reality spectacles, has been pressed. Preferably, the operating element is one and the same operating element that is used to confirm the virtual change of position and to prompt the position symbol, particularly also the selection symbol, to be shown. By way of example, the remote control that comprises said key may be in a form such that it can be operated in the manner of a kind of ball point pen. As soon as the wearer of the virtual reality spectacles should desire a virtual change of position, he depresses the virtual key as in the case of a ballpoint pen. Should he desire merely the display of the position symbol, particularly also of the selection symbol, he merely touches the key, as if one were merely to touch the top of a ballpoint pen and not press it.

Preferably, pressing the operating element is distinguished from touching the operating element in that pressing executes greater travel of the operating element and/or exerts greater pressure on the operating element than touching. By way of example, the operating element can comprise both capacitive sensors and pressure sensors. Alternatively or in addition, it also possible for the operating element to have one or more corresponding displacement sensors that can be used to sense the key travel effected at the operating element. It is thus possible for the distinction between pure touching and pressing of the operating element to be drawn reliably.

In a further advantageous embodiment, the respective virtual angle of vision from which the virtual object is displayed from the respective observation positions is altered on the basis of a sensed swiveled position of the head of the wearer of the virtual reality spectacles. By swiveling his head up or down or left or right, the user can thus alter his respective virtual angle of vision with respect to the currently displayed virtual object. This results in particularly simple control of the virtual reality spectacles, which alters the angle of vision with respect to the currently displayed virtual object subsequent to the swivel movement of the head of the wearer as appropriate.

Preferably, the virtual object displayed is a motor vehicle, with the position symbol being arranged and displayed outside or inside the motor vehicle. The wearer of the virtual reality spectacles can therefore skip from one virtual observation position to the next and look at the virtual motor vehicle from a wide variety of different perspectives. In so doing, he can also skip to a virtual observation position inside the motor vehicle in order to be able to display the interior from the driver's seat or else from other seat positions inside the motor vehicle, for example. This means that, at sales sites or showrooms for motor vehicles, for example, it is no longer necessary to keep a diverse array of different motor vehicle variants with a wide variety of special equipment, since a potential customer can particularly easily use the virtual reality spectacles to display vehicle variants with a wide variety of equipment inside and outside and for a wide variety of angles of vision.

The system proposed by the inventors comprises virtual reality spectacles that are designed to display at least one virtual object arranged in virtual surroundings from a first observation position. Furthermore, the virtual reality spectacles are designed to display at least one position symbol within the virtual surroundings at a position within the virtual surroundings that corresponds to a second observation position within the virtual surroundings. In addition, the system has a control device that is designed to select the displayed position symbol as soon as a predetermined selection action has been sensed. Additionally, the control device is designed to actuate the virtual reality spectacles such that the virtual object is displayed from the second observation position as soon as a predetermined confirmation action for the selected symbol has been sensed. Advantageous refinements of the method can be regarded as advantageous refinements of the system, the system carries out the method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

In the figures, elements that are the same or that have the same function are provided with the same reference symbols.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
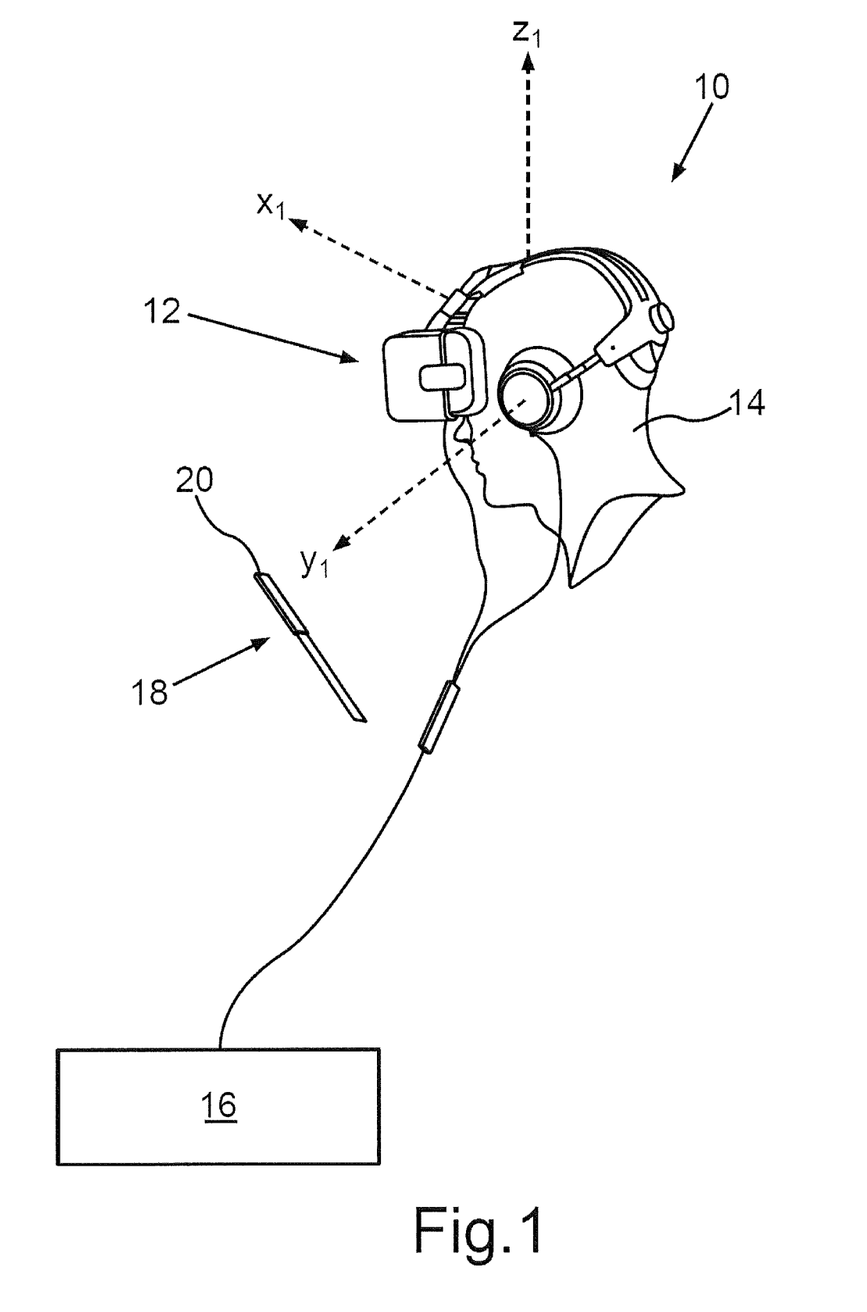
FIG. 1 shows a schematic illustration of a system for displaying virtual surroundings, wherein the system comprises virtual reality spectacles worn by a user, a control device for controlling the virtual reality spectacles and a remote control for controlling the image contents displayed by the virtual reality spectacles.

A system—denoted as a whole by 10—for displaying virtual surroundings is shown in FIG. 1. The system 10 comprises virtual reality spectacles 12 that are designed to display virtual surroundings and also one or more virtual objects within the virtual surroundings. By way of example, the virtual reality spectacles 12 may have two individual displays that are arranged in front of respective eyes of a wearer 14 of the virtual reality spectacles 12, so that the two displays can be used to bring about a three-dimensional effect for the wearer 14 when the virtual surroundings are displayed.

In addition, the virtual reality spectacles 12 may have a combination of a three-axis gyrometer and acceleration sensors that can be used to sense particularly swivel movements of the head of the wearer 14 about respective spatial axes $x_1$, $y_2$ and $z_1$. This allows a respective virtual angle of vision of the wearer 14, from which one or more virtual objects are displayed within the virtual surroundings, to be altered from respective observation positions within the virtual surroundings on the basis of a sensed swiveled position of the head of the wearer 14 of the virtual reality spectacles 12.

The system 10 additionally comprises a control device 16 that is coupled to the virtual reality spectacles 12 for the purpose of information interchange. By way of example, the control device 16 may be a computer having a piece of software installed thereon as appropriate, so that the control device 16 can control the display of the virtual surroundings by the virtual reality spectacles 12.

Furthermore, the system 10 also has a remote control 18 that is coupled both to the virtual reality spectacles 12 and to the control device 16, preferably via a radio link, for the purpose of information interchange. The remote control 18 can be used by the wearer 14, for example by operating a key 20 on the remote control 18, to control the virtual reality spectacles 12 in order to alter displayed virtual contents as appropriate.

Figure 2:
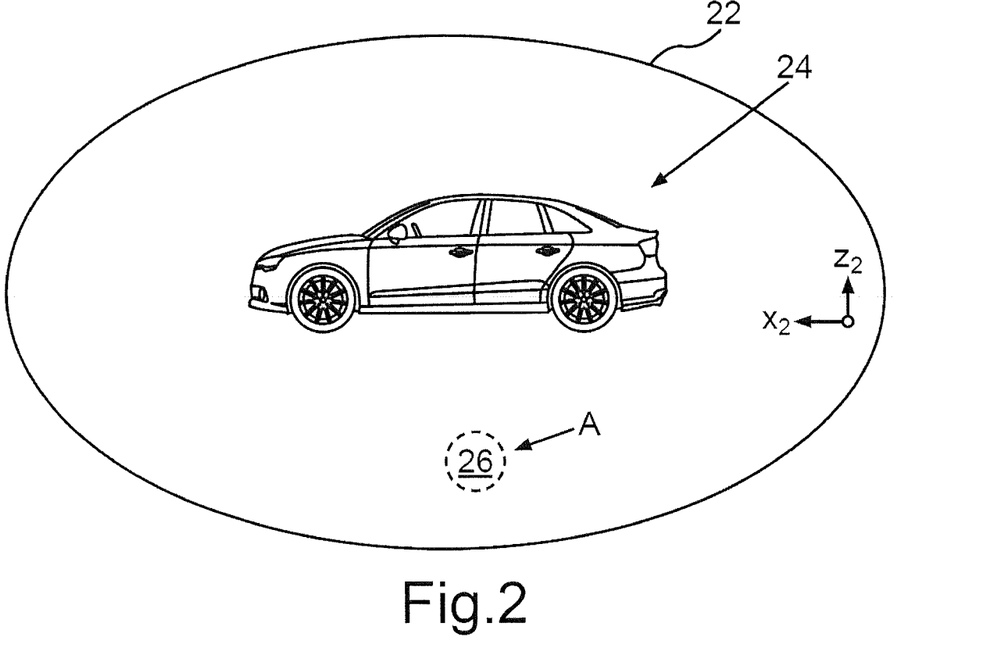
FIG. 2 shows a schematic illustration of virtual surroundings within which a virtual motor vehicle is displayed to the wearer of the virtual reality spectacles from a first virtual observation position.

FIG. 2 shows virtual surroundings 22, with a virtual motor vehicle 24 being displayed within the virtual surroundings 22 by the virtual reality spectacles 12. Corresponding coordinate axes within the virtual surroundings 22 are denoted by $x_2$ and $z_2$ and also by $y_2$. The letter A denotes a first observation position, that is to say a type of virtual viewpoint, within the virtual surroundings 22, from which the wearer 14 is currently looking at the motor vehicle 24.

The circle 26 shown in a dashed line is a position symbol that is arranged at the first virtual observation position. Preferably, the position symbol 26 is not displayed within the virtual surroundings 22 at all in the view shown here. In the present case, the position symbol 26 is shown only to improve understanding of the explanations below.

Figure 3:
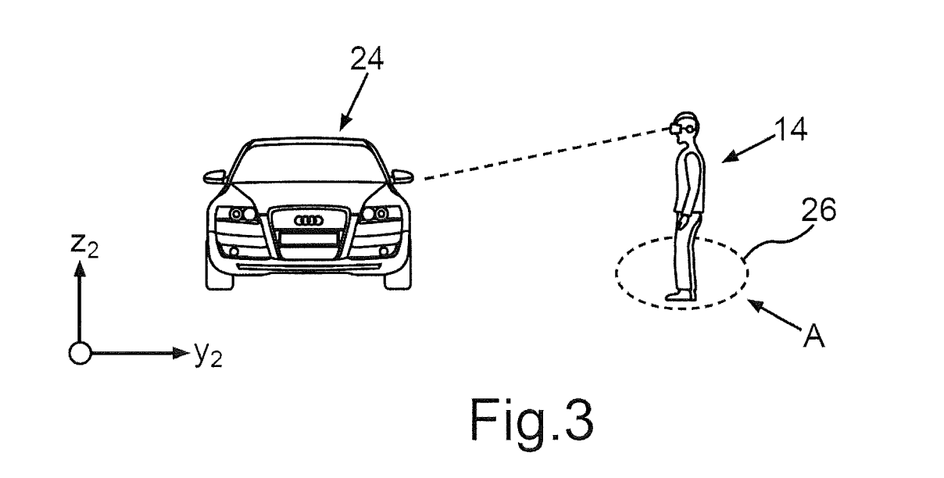
FIG. 3 shows a schematic illustration in which the virtual observation position of the wearer of the virtual reality spectacles with respect to the virtual motor vehicle, as shown in FIG. 2, is displayed.

FIG. 3 shows a schematic illustration of the virtual observation position A of the wearer 14 together with the position symbol 26 in a side view. According to the illustration shown in FIG. 2, the wearer 14 of the virtual reality spectacles 12 is thus virtually standing next to the motor vehicle 24 and is looking at the motor vehicle 24 from the side. By swiveling his head, the wearer 14 can alter a respective virtual angle of vision from which the motor vehicle 24 is displayed from the observation position 26. In this case, the virtual viewpoint of the wearer 14 remains unchanged; the wearer 14 can alter a respective angle of vision with respect to the motor vehicle 24 only by swiveling his head left and right or up and down.

If the wearer 14 of the virtual reality spectacles 12 wishes to alter his observation position A in order to view the motor vehicle 24 from a different virtual position, for example from the front or from behind, he merely needs to touch the key 20 on the remote control 18. This activates a type of movement or skip mode.

Figure 4:
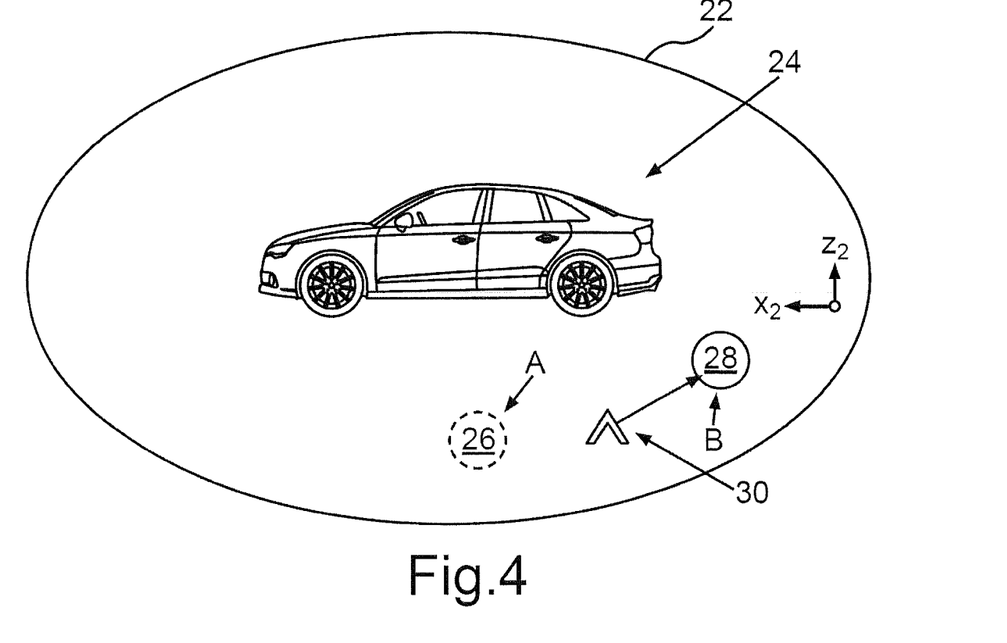
FIG. 4 again shows the virtual motor vehicle within the virtual surroundings, wherein additionally a selection symbol in a form like an arrow head and a position symbol represented as a circle in a solid line are shown.

As FIG. 4 shows, a position symbol 28 and a selection symbol 30 are then displayed within the virtual surroundings 22. The position symbol 28, displayed here in the form of a circular mark on the virtual ground of the virtual surroundings 22, is displayed at a position within the virtual surroundings 22 that corresponds to a second observation position B prescribed within the virtual surroundings 22, that is to say a further virtual viewpoint. In this case, the arrowhead-like selection symbol 30 is moved within the virtual surroundings 22 on the basis of a sensed head movement by the wearer 14 of the virtual reality spectacles 12. Alternatively or in addition, provision may also be made for the selection symbol 30 to be moved within the virtual surroundings 22 on the basis of a sensed eye movement by the wearer 14.

Should the wearer 14 of the virtual reality spectacles 12 now wish to be able to look at the motor vehicle 24 from the further observation position B, he merely needs to make the selection symbol 30 overlap the position symbol 28 in part or in full by an appropriate head and/or eye movement.

Figure 5:
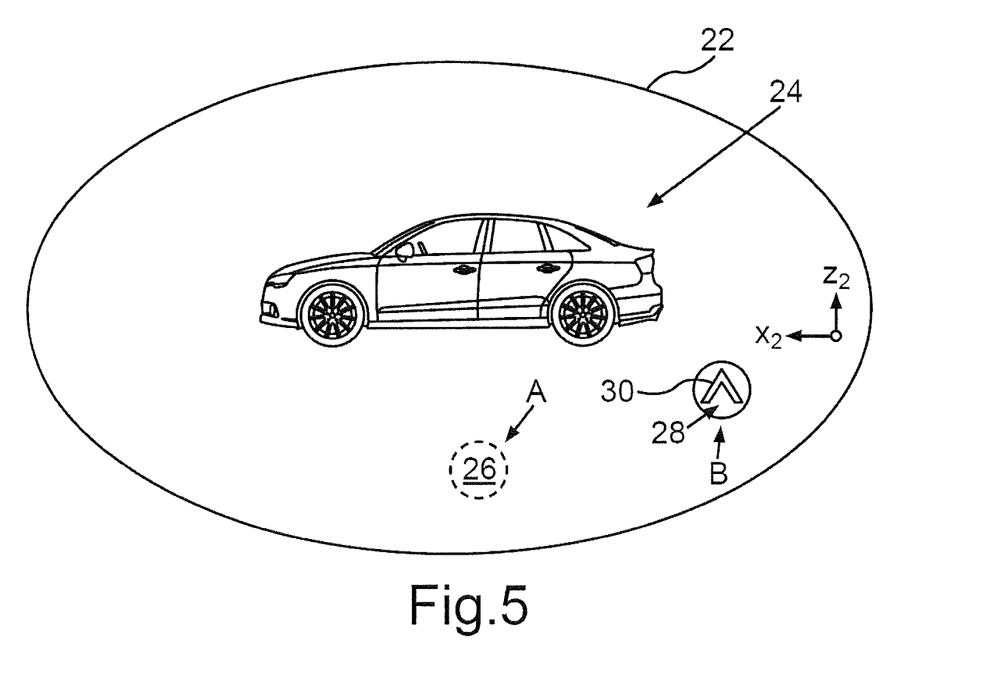
FIG. 5 shows substantially the same illustration as FIG. 4, wherein the selection symbol has been made to overlap the circular position symbol.

As soon as the selection symbol 30 has been made to overlap the position symbol 28, as shown in FIG. 5, the controller 16 registers that the position symbol 28 has been selected. In other words, it registers that the wearer 14 might wish to alter his virtual observation position, since he has moved the selection symbol 30 over the position symbol 28. Preferably, appropriate visual feedback can be displayed as soon as the position symbol 28 has been selected. By way of example, the color of the position symbol 28 and/or of the selection symbol 30 can also be altered, so that the wearer 14 is provided with visual feedback about the selection of the position symbol 28 in a simple manner. As shown by FIGS. 4 and 5, whether the position symbol is displayed is independent from the position of the selection symbol with respect to the position symbol.

Should the wearer 14 of the virtual reality spectacles 12 now actually wish to change his virtual observation position from the observation position A to the observation position B, he merely needs to press the key 20 on the remote control 18. By way of example, the key 20 may have an appropriate key travel with a stop, the change of position from the virtual observation position 26 to the virtual observation position 28 being confirmed only when the key has been depressed by the wearer 14 as far as its stop, for example.

Figure 6:
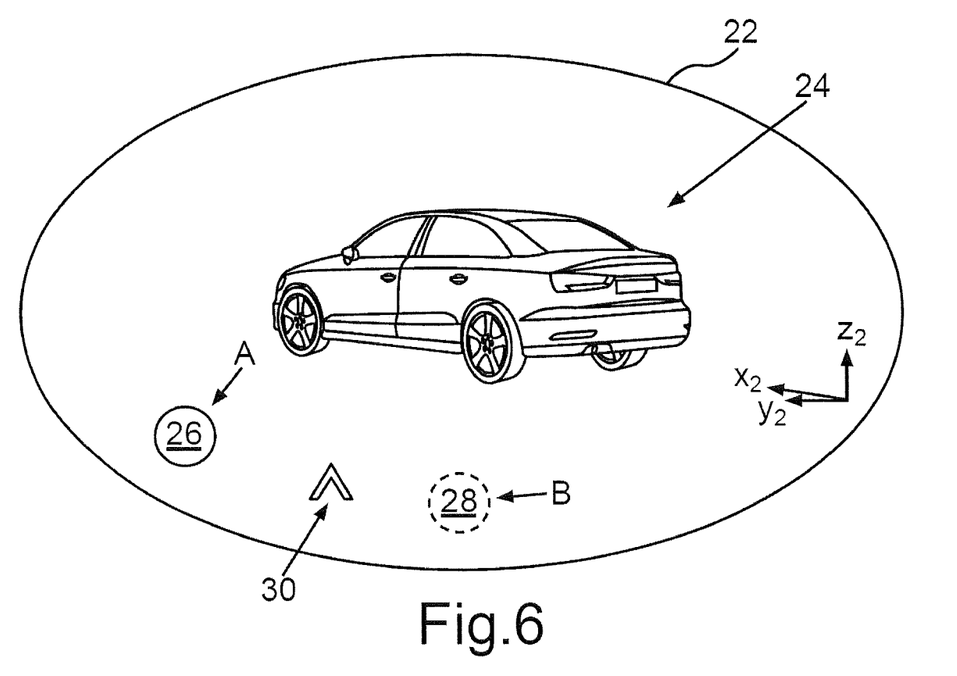
FIG. 6 shows a further illustration of the virtual surroundings, wherein the virtual motor vehicle is now displayed from a second virtual observation position.

FIG. 6 shows the motor vehicle 24 from the observation position B that has been virtually adopted at present after a virtual change of position from the observation position A to the observation position B has been made. The wearer 14 of the virtual reality spectacles 12 thus does not move continuously around the motor vehicle 24 in order to get from the observation position A to the observation position B. Instead, the wearer 14 skips virtually from the observation position A to the observation position B shown in FIG. 6 as soon as he has confirmed the change of position by pressing the key 20 on the remote control 18 after he has made the selection symbol 30 overlap the position symbol 28.

The position symbol 28 is subsequently shown only in a dashed line, and preferably, following the change of position, it is no longer displayed at all and is depicted in this case only to improve understanding. Should the wearer 14 still keep his thumb on the key 20, that is to say still touch it, for example, after the sudden change of position, the selection symbol 30 and the position symbol 26 continue to be displayed. As soon as the wearer 14 releases the key 20 on the remote control 18, that is to say no longer touches it at all, the position symbol 26 and the selection symbol 30 are hidden.

In the present case, the wearer 14 can look at the motor vehicle 24 diagonally from the side at the rear from the observation position B, and in this case too, the angle of vision with respect to the motor vehicle 24 is altered on the basis of sensed swivel movements of the head of the wearer 14, the observation position remaining firmly at the observation position B.

Should the wearer 14 again desire a change of position, he can again activate the movement or skip mode by touching the key 20 on the remote control 18, which again shows the selection symbol 30 and the position symbol 26. As soon as the wearer 14 has made the selection symbol 30 overlap the position symbol 26 by an appropriate head or eye movement, said position symbol is selected. As soon as the wearer 14 then presses the key 20, a virtual change of position is again carried out from the observation position B to the observation position A, as a result of which the wearer 14 of the virtual reality spectacles 12 again looks at the motor vehicle 24 purely from the side, as shown in FIGS. 2, 4 and 5.

Apart from at the observation positions A and B, it is also possible for further position symbols, not shown here, to be shown within the virtual surroundings 22, so that the wearer 14 of the virtual reality spectacles 12 can change his virtual observation position within the virtual surroundings 22 in a similar manner to the procedure already described. Such position symbols can be displayed firstly in a distributed arrangement around the motor vehicle 24 and also in a distributed arrangement inside the motor vehicle 24. The wearer 14 of the virtual reality spectacles 12 can therefore not only virtually skip from one observation position to the next, which is situated outside the motor vehicle 24, but can also relocate his virtual observation position into the motor vehicle 24, for example into the driver's seat of the motor vehicle 24.

The wearer 14 of the virtual reality spectacles 12 therefore does not move around the displayed motor vehicle 24 continuously; instead, he skips from one virtual observation position to the next within the virtual surroundings 22 in order to change his angle of vision or his perspective with respect to the displayed motor vehicle 24.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for operating virtual reality spectacles, the method comprising:
    displaying a virtual object in a virtual environment for viewing from a first observation position that is prescribed within the virtual environment, using the virtual reality spectacles;
    displaying a position symbol at a position within the virtual environment that corresponds to a second observation position prescribed within the virtual environment;
    selecting the position symbol when a predetermined selection action has been sensed; and
    after selecting the position symbol, displaying the virtual object for viewing from the second observation position when a predetermined confirmation action for the position symbol has been sensed, wherein
    the position symbol is positioned so that, after the predetermined confirmation action, a wearer of the virtual reality spectacles is given an impression that the wearer is situated in the virtual environment at the position of the position symbol,
    the predetermined selection action is that a selection symbol displayed within the virtual environment has been made to at least partially overlap the position symbol,
    whether the position symbol is displayed is independent from the position of the selection symbol with respect to the position symbol,
    the virtual object is a motor vehicle, and
    when the position symbol is displayed inside the motor vehicle, after the predetermined confirmation action, the wearer of the virtual reality spectacles is given an impression that the wearer is situated in the virtual environment at the position inside the motor vehicle.

2. The method according to claim 1, wherein
    the selection symbol is moved within the virtual environment based on a sensed head movement of the wearer of the virtual reality spectacles.

3. The method according to claim 1, wherein
    the selection symbol is moved within the virtual environment based on a sensed eye movement of the wearer of the virtual reality spectacles.

4. The method according to claim 1, wherein
    the position symbol is displayed within the virtual environment only when an operating element coupled to the virtual reality spectacles is activated.

5. The method according to claim 4, wherein
the position symbol is hidden from the virtual environment when the operating element is deactivated.

6. The method according to claim 4, wherein
the operating element corresponds to a key arranged on a remote control.

7. The method according to claim 4, wherein
the predetermined confirmation action is that the operating element coupled to the virtual reality spectacles has been activated.

8. The method according to claim 7, wherein
the operating element corresponds to a key arranged on a remote control.

9. The method according to claim 7, wherein the operating element used to display the virtual object for viewing from the second observation position is also used to display the position symbol within the virtual environment.

10. The method according to claim 9, wherein
the operating element is activated by at least one of pressing the operating element and touching the operating element, and
pressing the operating element is distinguished from touching the operating element by at least one of:
  pressing executes greater travel of the operating element than touching; and
  pressing exerts greater pressure on the operating element than touching.

11. The method according to claim 4, wherein
the operating element is activated according to a first action to display the position symbol,
the operating element is activated according to a second action to display the virtual object for viewing from the second observation position,
one of the first action and the second action corresponds to touching the operating element,
the other of the first action and the second action corresponds to pressing the operating element, and
pressing the operating element is distinguished from touching the operating element in at least one of the following manners:
  pressing executes greater travel of the operating element than touching, and
  pressing exerts greater pressure on the operating element than touching.

12. The method according claim 1, wherein
a respective virtual angle of vision from which the virtual object is displayed for viewing from the first and second observation positions is altered based on a sensed swiveled position of a head of the wearer of the virtual reality spectacles.

13. The method according to claim 1, wherein
a plurality of position symbols are arranged within the virtual environment and at least one of the position symbols is displayed inside the motor vehicle.

14. A virtual reality system, comprising:
virtual reality spectacles to display a virtual object in a virtual environment for viewing from a first observation position, and to display a position symbol within the virtual environment at a second observation position within the virtual environment; and
a control device to select the position symbol when a predetermined selection action has been sensed, and to control the virtual reality spectacles to display the virtual object for viewing from the second observation position when a predetermined confirmation action has been sensed after the position symbol has been selected, wherein the predetermined selection action is that a selection symbol displayed within the virtual environment has been made to at least partially overlap the position symbol,
whether the position symbol is displayed is independent from the position of the selection symbol with respect to the position symbol,
the virtual object is a motor vehicle, and
when the position symbol is displayed inside the motor vehicle, after the predetermined confirmation action, a wearer of the virtual reality spectacles is given an impression that the wearer is situated in the virtual environment at the position inside the motor vehicle.

15. The virtual reality system of claim 14, further comprising:
a remote control which includes an operating element to receive an input from the wearer of the virtual reality spectacles,
wherein when the operating element is activated, the position symbol and the selection symbol are displayed within the virtual environment.

16. The virtual reality system of claim 15, wherein
the remote control is wirelessly connected to the virtual reality spectacles and the control device.

17. The virtual reality system of claim 15, wherein
the control device moves the selection symbol within the virtual environment based on at least one of a sensed head movement of the wearer of the virtual reality spectacles and a sensed eye movement of the wearer of the virtual reality spectacles, and
as the selection symbol moves toward the position symbol, a color of at least one of the position symbol and the selection symbol changes to provide visual feedback to the wearer of the virtual reality spectacles.

18. A method for operating virtual reality spectacles worn by a user, the method comprising:
displaying a virtual object in a virtual environment for viewing from a first viewpoint within the virtual environment, using the virtual reality spectacles;
receiving an input activating a skip mode for displaying the virtual object in the virtual environment;
only in response to receiving the input activating the skip mode, displaying a position symbol at a position within the virtual environment that corresponds to a second viewpoint within the virtual environment, and displaying a selection symbol within the virtual environment;
receiving an input moving the selection symbol within the virtual environment;
when the selection symbol is moved within the virtual environment such that the selection symbol at least partially overlaps the position symbol, recognizing that the position symbol has been selected; and
when the position symbol has been selected, receiving an input relocating an observation position of the user from the first viewpoint to the second viewpoint and displaying the virtual object in the virtual environment for viewing from the second viewpoint within the virtual environment, wherein
the position symbol is positioned so that, after the predetermined confirmation action, a wearer of the virtual reality spectacles is given an impression that the wearer is situated in the virtual environment at the position of the position symbol,
whether the position symbol is displayed is independent from the position of the selection symbol with respect to the position symbol, the virtual object is a motor vehicle, and when the position symbol is displayed inside the motor vehicle, after the predetermined confirmation action, the wearer of the virtual reality spectacles is given an impression that the wearer is situated in the virtual environment at the position inside the motor vehicle.

19. The method according to claim 1, wherein the virtual reality spectacles skip from the first observation position to the second observation position to thereby avoid a continual virtual movement around the virtual object from the first observation position to the second observation position.

\* \* \* \* \*

UNITED STATES PATENT AND TRADEMARK OFFICE
CERTIFICATE OF CORRECTION

PATENT NO.         : 10,579,139 B2
APPLICATION NO.    : 14/743226
DATED              : March 3, 2020
INVENTOR(S)        : Marcus Kuehne et al.

It is certified that error appears in the above-identified patent and that said Letters Patent is hereby corrected as shown below:

In the Claims

Column 9, Line 45:
Claim 12, after "according" insert -- to --.

Signed and Sealed this
Nineteenth Day of May, 2020

Andrei Iancu
*Director of the United States Patent and Trademark Office*